United States Patent
Collins

(10) Patent No.: US 7,679,295 B1
(45) Date of Patent: Mar. 16, 2010

(54) CONVERTER WITH FEEDBACK VOLTAGE REFERENCED TO OUTPUT VOLTAGE WITH SEPARATE GROUND PLANES FOR CONVERTER AND LOAD

(75) Inventor: Michael J. Collins, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 91 days.

(21) Appl. No.: 11/940,186

(22) Filed: Nov. 14, 2007

Related U.S. Application Data

(62) Division of application No. 11/073,035, filed on Mar. 4, 2005, now Pat. No. 7,317,302.

(51) Int. Cl.
*H05B 37/02* (2006.01)

(52) U.S. Cl. .................. 315/291; 315/225; 315/299; 315/307; 323/222

(58) Field of Classification Search ............. 315/185 R, 315/209 R, 224, 225, 247, 291, 299, 307–308; 323/222, 285, 299; 363/39, 59–60, 259
See application file for complete search history.

(56) References Cited

U.S. PATENT DOCUMENTS

| | | | |
|---|---|---|---|
| 5,491,388 A * | 2/1996 | Nobuyuki et al. ........... 315/308 |
| 5,754,419 A | 5/1998 | Ho et al. | |
| 5,801,518 A | 9/1998 | Ozaki et al. | |
| 6,469,481 B1 | 10/2002 | Tateishi et al. | |
| 6,577,072 B2 | 6/2003 | Saito et al. | |
| 6,822,403 B2 | 11/2004 | Horiuchi et al. | |
| 6,963,177 B2 | 11/2005 | Ito et al. | |
| 6,989,657 B2 | 1/2006 | Kirn | |
| 7,067,993 B2 | 6/2006 | Youle et al. | |
| 2003/0209997 A1 | 11/2003 | St-Germain et al. | |
| 2004/0051382 A1* | 3/2004 | Gavrila et al. ................ 307/29 |
| 2005/0110469 A1* | 5/2005 | Inaba et al. ................ 323/222 |
| 2006/0043911 A1* | 3/2006 | Shao et al. ................... 315/291 |
| 2006/0071614 A1* | 4/2006 | Tripathi et al. .............. 315/291 |
| 2006/0087259 A1* | 4/2006 | Fiorello ....................... 315/291 |
| 2006/0176029 A1* | 8/2006 | McGinty et al. ............. 323/222 |
| 2006/0267514 A1* | 11/2006 | Xu ............................... 315/291 |

OTHER PUBLICATIONS

Mardiguian, Controlling Radiated Emissions by Design, 1992, Van Nostrans Reinhold, first edition, pp. 96-99.

* cited by examiner

*Primary Examiner*—David Hung Vu
*Assistant Examiner*—Tung X Le
(74) *Attorney, Agent, or Firm*—Darby & Darby P.C.; Matthew M. Gaffney

(57) ABSTRACT

A driver for a white LED string or a display is provided. The driver includes a boost converter that is arranged to provide an output voltage from a source voltage. Also, the driver includes a sense resistor that is coupled between the output voltage and a feedback voltage. The sense resistor is coupled in series with the white LED string or the display. Further, the boost converter uses the sense voltage across the sense resistor to regulate the output voltage. In one embodiment, the boost converter includes a level shifter that converts the sense voltage into a comparison signal that is referenced to ground. In another embodiment, the converter employs a reference voltage that is referenced to the output voltage.

11 Claims, 9 Drawing Sheets

CONVERTER WITH FEEDBACK VOLTAGE REFERENCED TO OUTPUT VOLTAGE WITH SEPARATE GROUND PLANES FOR CONVERTER AND LOAD

CROSS-REFERENCE TO RELATED APPLICATIONS

This Application is a Divisional of U.S. patent application Ser. No. 11/073,035, filed on Mar. 4, 2005, entitled "CONVERTER WITH FEEDBACK VOLTAGE REFERENCED TO OUTPUT VOLTAGE," and claims the benefit under 35 U.S.C. §121, which is further incorporated herein by reference.

BACKGROUND OF THE INVENTION

Light-emitting diodes (LEDs) may be used for lighting in portable electronics applications, and the like. For example, white LEDs may be used for back-lighting applications. Typically, several white LEDs are coupled in series. A boost switching regulator may be employed to provide a voltage across the white LEDs.

BRIEF DESCRIPTION OF THE DRAWINGS

Non-limiting and non-exhaustive embodiments of the present invention are described with reference to the following drawings, in which.

DETAILED DESCRIPTION OF THE INVENTION

Figure 1:
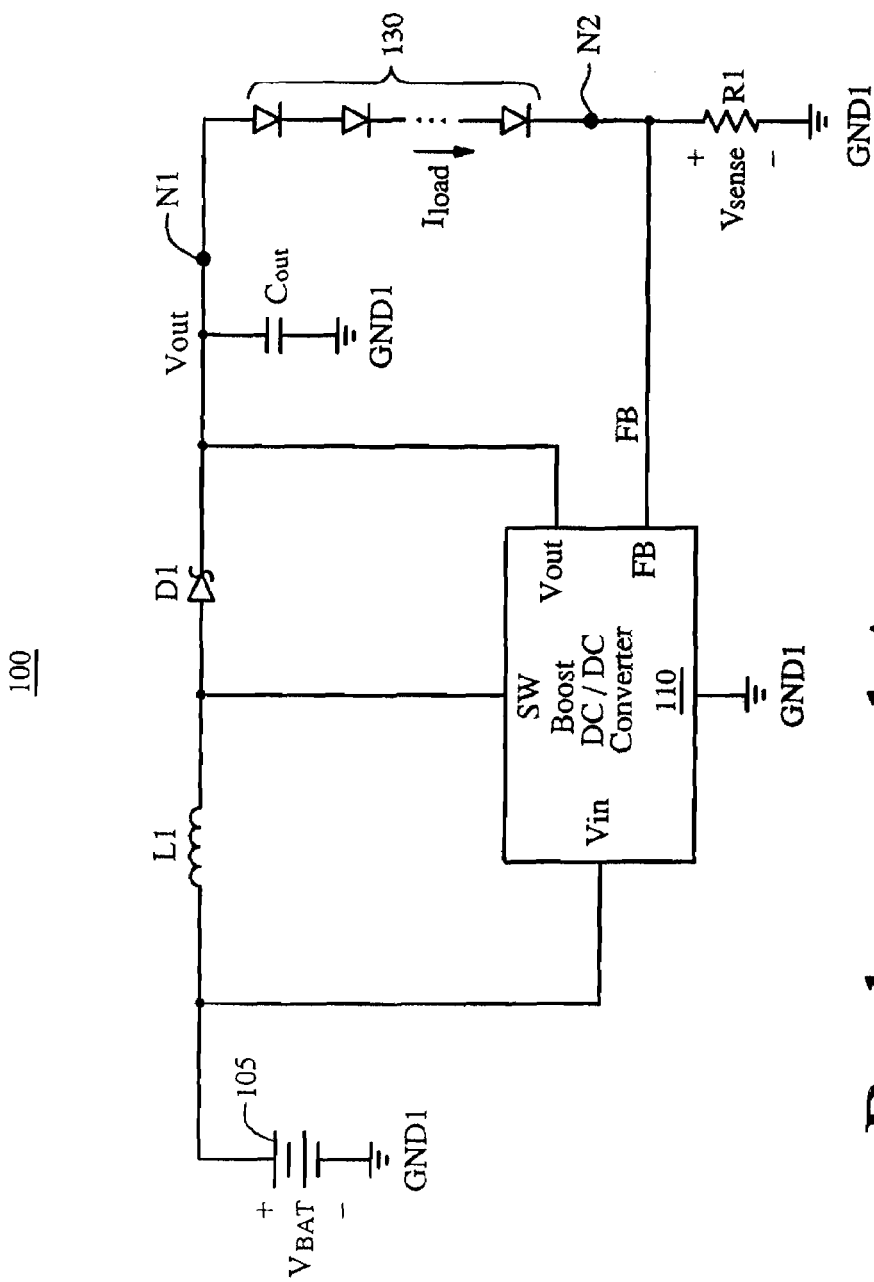
FIG. 1 illustrates a block diagram of a circuit for driving an LED string or a display.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a driver for a white LED string or a display. The driver includes a boost converter that is arranged to provide an output voltage from a source voltage. Also, the driver includes a sense resistor that is coupled between the output voltage and a feedback voltage. The sense resistor is coupled in series with the white LED string or the display. Further, the boost converter uses the sense voltage across the sense resistor to regulate the output voltage. In one embodiment, the boost converter includes a level shifter that converts the sense voltage into a comparison signal that is referenced to ground. In another embodiment, the converter employs a reference voltage that is referenced to the output voltage.

FIG. 1 illustrates a block diagram of circuit 100. Circuit 100 includes battery 105, inductor L1, diode D1, boost converter 110, output capacitor Cout, load 130, and sense resistor circuit R1. Load 130 may be a white LED string or a display.

Load 130 is coupled between output node N1 and feedback node N2. Sense resistor R1 is coupled between node N2 and ground $GND_1$. Sense resistor circuit R1 is series-coupled with load 130 so that sense resistor circuit R1 receives load current Iload. Accordingly, a voltage drop Vsense given by Iload*R1 appears across resistor circuit R1. The voltage at node N2 is accordingly given by Iload*R1. The voltage at node N2 is referenced to ground $GND_1$.

Also, boost converter 100 is configured to, in cooperation with inductor L1, diode D1, capacitor Cout, and sense resistor circuit R1, provide output voltage Vout from voltage VBAT, such that voltage Vout is regulated based on feedback signal FB at node N2. Signal FB is referenced to ground plane $GND_1$, which is local to boost converter 100. Boost converter 100 may be included in an integrated circuit (IC).

However, circuit 100 is not suitable for certain applications. For example, in certain applications, it may be preferable for the display or white LEDs to be separate from the boost converter IC and independent of grounding.

Figure 2:
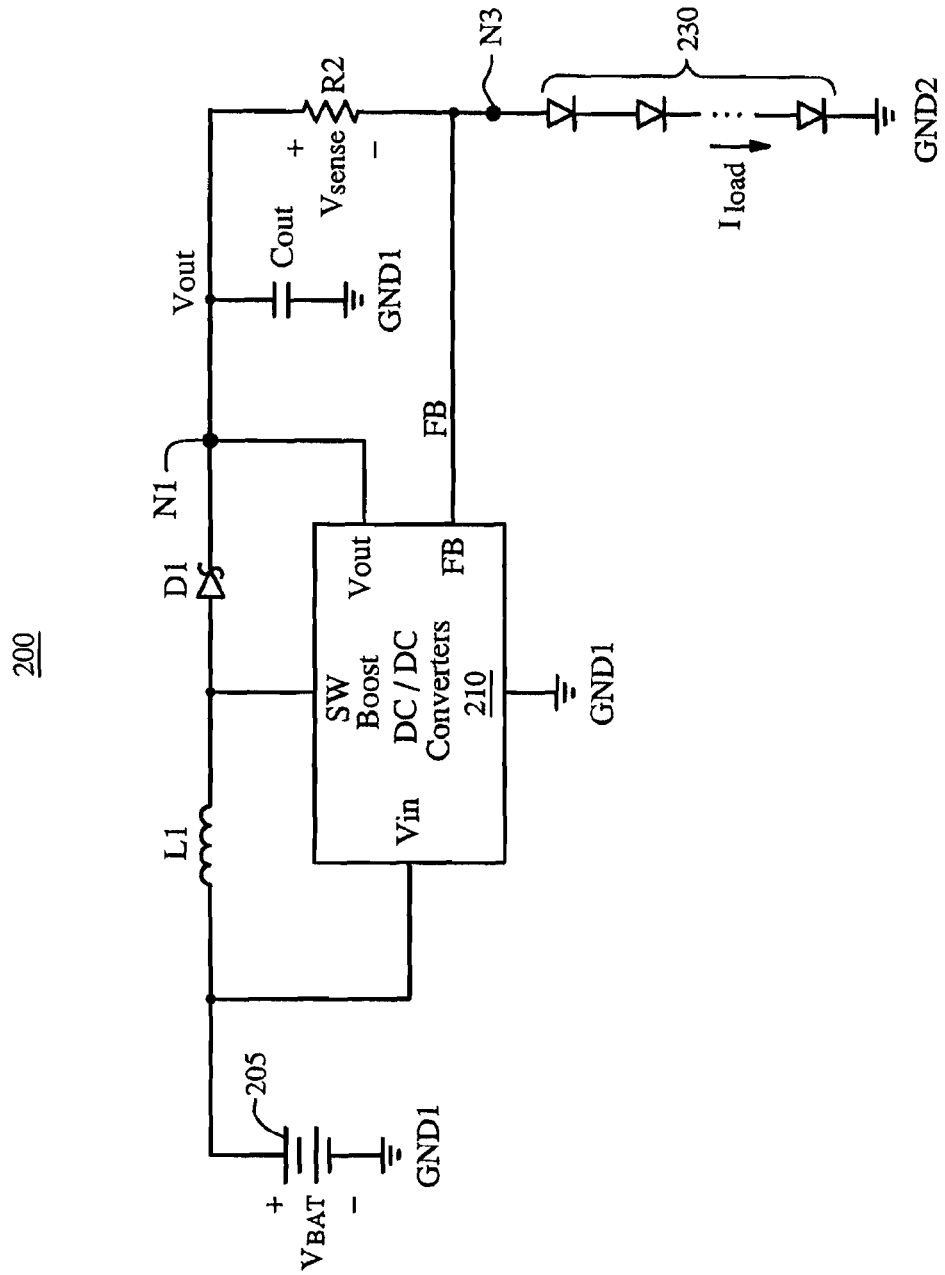
FIG. 2 shows a block diagram of an embodiment of a circuit for driving an LED string or a display in which the feedback voltage is referenced to Vout rather than ground.

FIG. 2 shows a block diagram of an embodiment of circuit 200. Circuit 200 includes battery 205, inductor L1, diode D1, boost converter 210, output capacitor Cout, load 230, and sense resistor circuit R2.

Ground $GND_1$ is a local ground plane for boost converter 210. In one embodiment, ground $GND_1$ is a ground plane that is close to battery 205 on a printed circuit board (PCB). $GND_2$ is a ground plane that is separate from ground $GND_1$. In one embodiment, $GND_2$ is a ground plane on a PCB that is separate from the PCB that $GND_1$ is on. In another embodiment, GND$_2$ is a separate ground plane that is connected at battery 205. In one embodiment, load 230 may be on a flip phone or similar device, having GND$_2$ as a separate plane which is connected with wires which may include resistances, inductances, and the like. Accordingly, the voltage at GND$_2$ may move relative to the voltage at GND$_1$.

Also, load 230 is coupled between output node N3 and ground GND$_2$. In one embodiment, load 230 is a string of series white LEDs. In another embodiment, load 230 is a display.

Further, sense resistor circuit R2 is coupled between output node N1 and feedback node N3. Sense resistor circuit R2 is series-coupled with load 230 so that sense resistor circuit R2 receives load current Iload. Accordingly, a voltage drop Vsense given by Iload*R2 appears across resistor circuit R2. The voltage at node N3 is accordingly given by Vout−Iload*R2. The voltage at node N3 is referenced to output voltage Vout.

Like circuit 100, circuit 200 is configured to, in conjunction with other circuit elements, regulate output voltage Vout based on feedback signal FB. However, in circuit 100, feedback signal FB is referenced to ground. In contrast, in circuit 200, feedback signal FB is referenced to output voltage Vout rather than ground.

By regulating output voltage Vout based on a feedback signal that is referenced to Vout rather than ground, ground plane GND$_2$ may be separate from ground plane GND$_1$. This provides more flexibility with the PCB layout, allowing the vendor to keep the electronics located on one PCB while the display and/or white LEDs are separate and away from the driver. Also, circuit 200 may provide improved immunity to trace resistance and inductance found in the display or LED bus line, GND$_2$, or the connection at node N3.

FIG. 2 illustrates an embodiment of circuit 200 in which an asynchronous-rectified inductive-based boost converter is employed. In another embodiment, boost converter 210 is a synchronously-rectified converter. In another embodiment, boost converter 210 is a switched-capacitor based boost converter.

In one embodiment, sense resistor circuit R2 is a single resistor. In another embodiment, sense resistor circuit 12 includes two or more resistors coupled in series and/or in parallel to provide a total equivalent resistance.

In one embodiment, the components shown inside boost converter 210 in FIG. 2 are included together in an integrated circuit, and components shown outside of boost converter 210 in FIG. 2 are external to the integrated circuit. In other embodiments, some of the components shown inside boost converter 210 may be external to the integrated circuit and/or some of the components shown outside of boost converter 210 may be internal to the integrated circuit. For example, in one embodiment, sense resistor circuit R2 is included in the integrated circuit, and in another embodiment, sense resistor circuit R2 is external to the integrated circuit.

Figure 3:
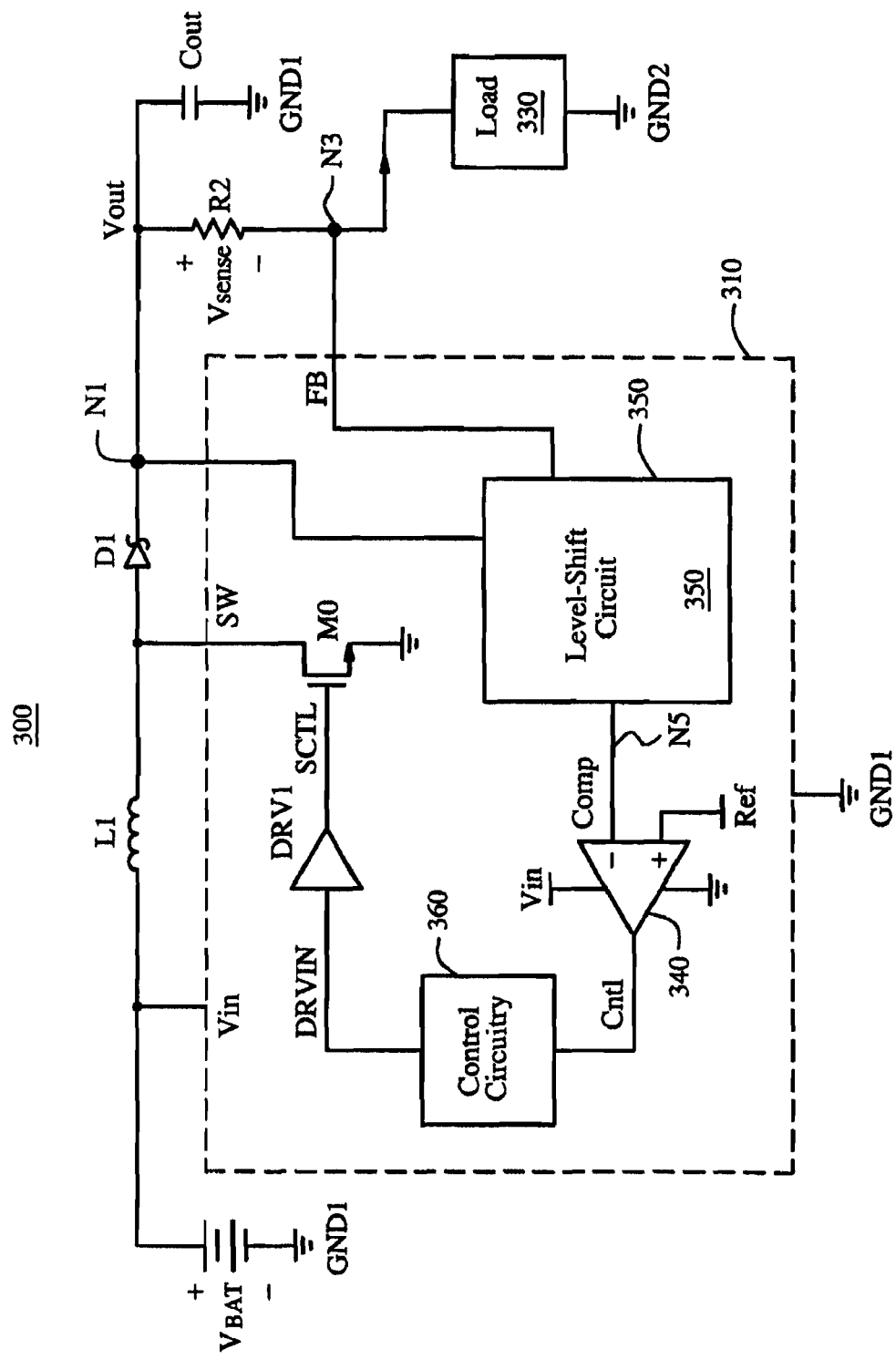
FIG. 3 illustrates a block diagram of an embodiment of the circuit of FIG. 2 in which the boost converter includes a level-shift circuit.

FIG. 3 illustrates a block diagram of an embodiment of circuit 300. Circuit 300 may be employed as an embodiment of circuit 200 of FIG. 2. Boost converter 310 includes level-shift circuit 350, feedback circuit 340, control circuitry 360, driver circuit DRV1, and power transistor M0.

Figure 9:
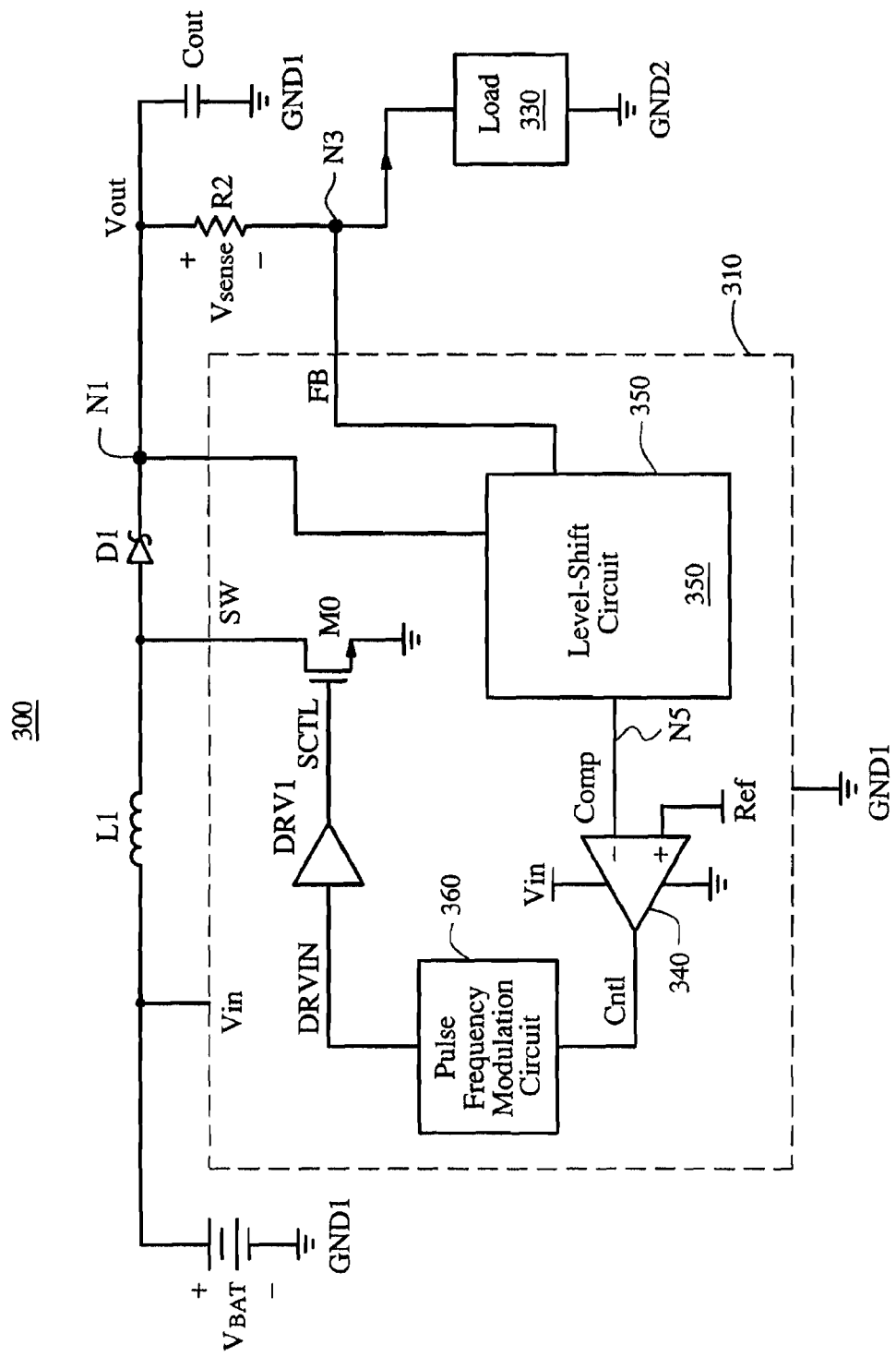
FIG. 9 illustrates a block diagram of an embodiment of the circuit of FIG. 3 in which the control circuitry includes a pulse frequency modulation circuit, arranged in accordance with aspects of the present invention.

In operation, level-shift circuit 350 provides comparison signal Comp from signal FB by level-shifting signal FB such that signal Comp is referenced to GND$_1$. Feedback circuit 340 is arranged to provide control signal Cnt1 from signal Comp and signal Ref. Signal Ref is a reference signal that is referenced to ground. Also, control circuitry 360 is arranged to provide signal DRVIN from signal Cnt1. In one embodiment, feedback circuit 340 is an error amplifier, and control circuitry 360 is arranged to provide signal DRVIN such that a pulse width of signal DRVIN is modulated based, in part, on control signal Cnt1. In another embodiment, feedback circuit 340 is a comparator, and control circuitry 360 is arranged to provide signal DRVIN such that a frequency of signal DRVIN is modulated based, in part, on control signal Cnt1 (as illustrated in FIG. 9 in one embodiment).

In either case, driver circuit DRV1 may be arranged to provide switch control signal SCTL based on signal DRVIN. Additionally, power transistor M0 may be arranged to operate as a switch circuit that opens and closes based on switch control signal SCTL.

Although not shown in FIG. 3, in one embodiment, reference signal Ref may be provided by a voltage reference circuit that is arranged to provide signal Ref.

In one embodiment, reference signal Ref may be adjustable based on an external signal that the brightness provided by load 330 is adjustable. In other embodiments, the brightness may be adjustable by adjusting the duty signal of an enable signal for boost converter 310.

Level-shift circuit 350 may be arranged to operate as follows. A resistor circuit (not shown in FIG. 3) in level-shift circuit 350 is arranged such that a voltage drop across the resistor circuit is equal to the voltage drop across sense resistor circuit R2, and further arranged to provide a current responsive to the voltage drop across it. An impedance circuit (not shown in FIG. 3) coupled between node N5 and GND$_1$ receives the current and provides signal Comp at node N5. An embodiment of level-shift 350 is illustrated and described with reference to FIG. 4 below.

Although transistor M0 is shown as a MOSFET in FIG. 3, in other embodiments, a type of transistor other than a MOSFET may be used instead.

In one embodiment, the components shown inside boost converter 310 in FIG. 3 are included together in an integrated circuit, and components shown outside of boost converter 310 in FIG. 3 are external to the integrated circuit. In other embodiments, some of the components shown inside boost converter 310 may be external to the integrated circuit and/or some of the components shown outside of boost converter 310 may be internal to the integrated circuit. For example, in one embodiment, sense resistor circuit R2 is included in the integrated circuit, and in another embodiment, sense resistor circuit R2 is external to the integrated circuit. As another example, in one embodiment, power transistor M0 is included in the integrated circuit, an in another embodiment, power transistor M0 is external to the integrated circuit.

Figure 7:
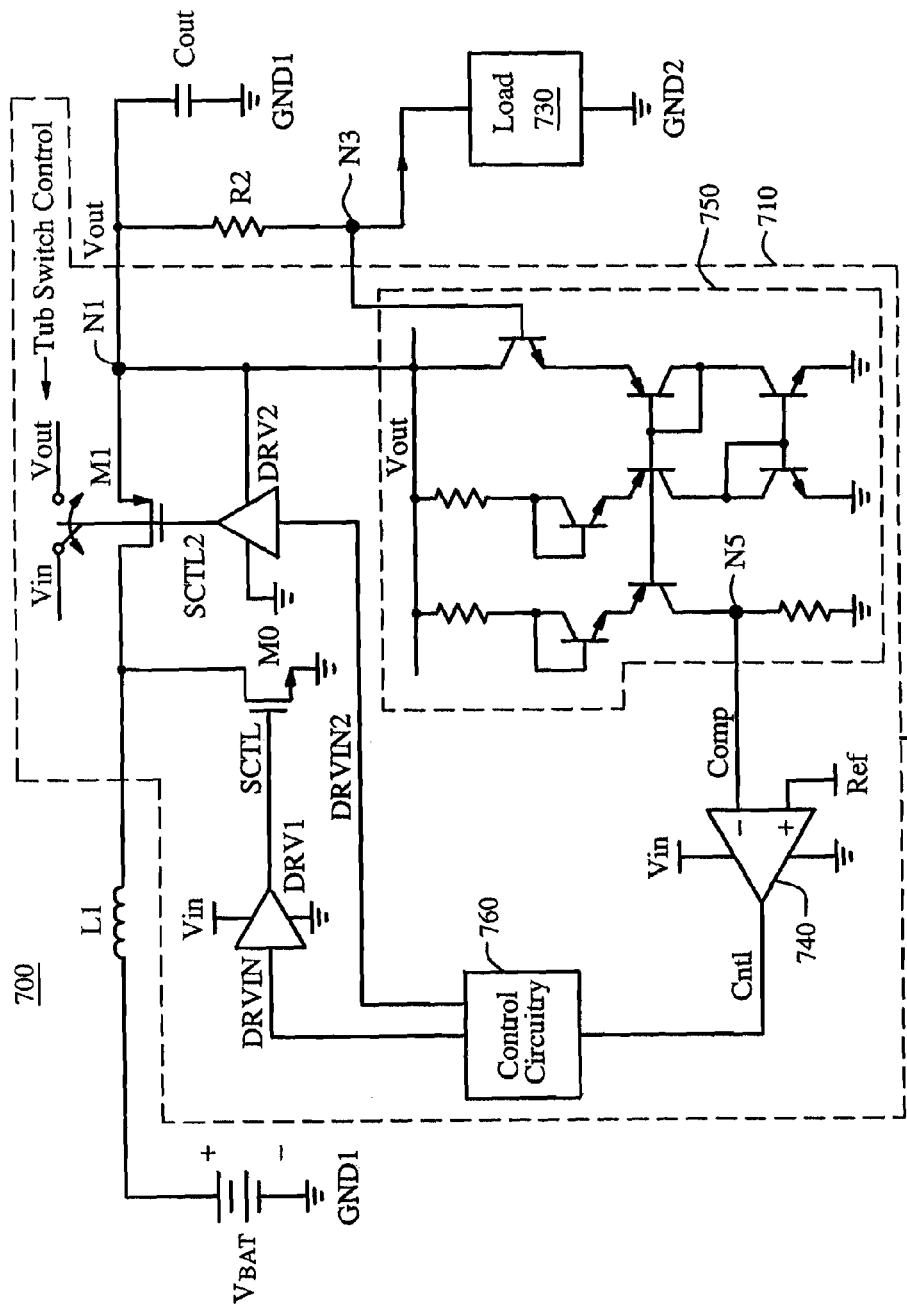
FIG. 7 illustrates a block diagram of an embodiment of the circuit of FIG. 3 in which the boost converter is synchronously rectified.
Figure 8:
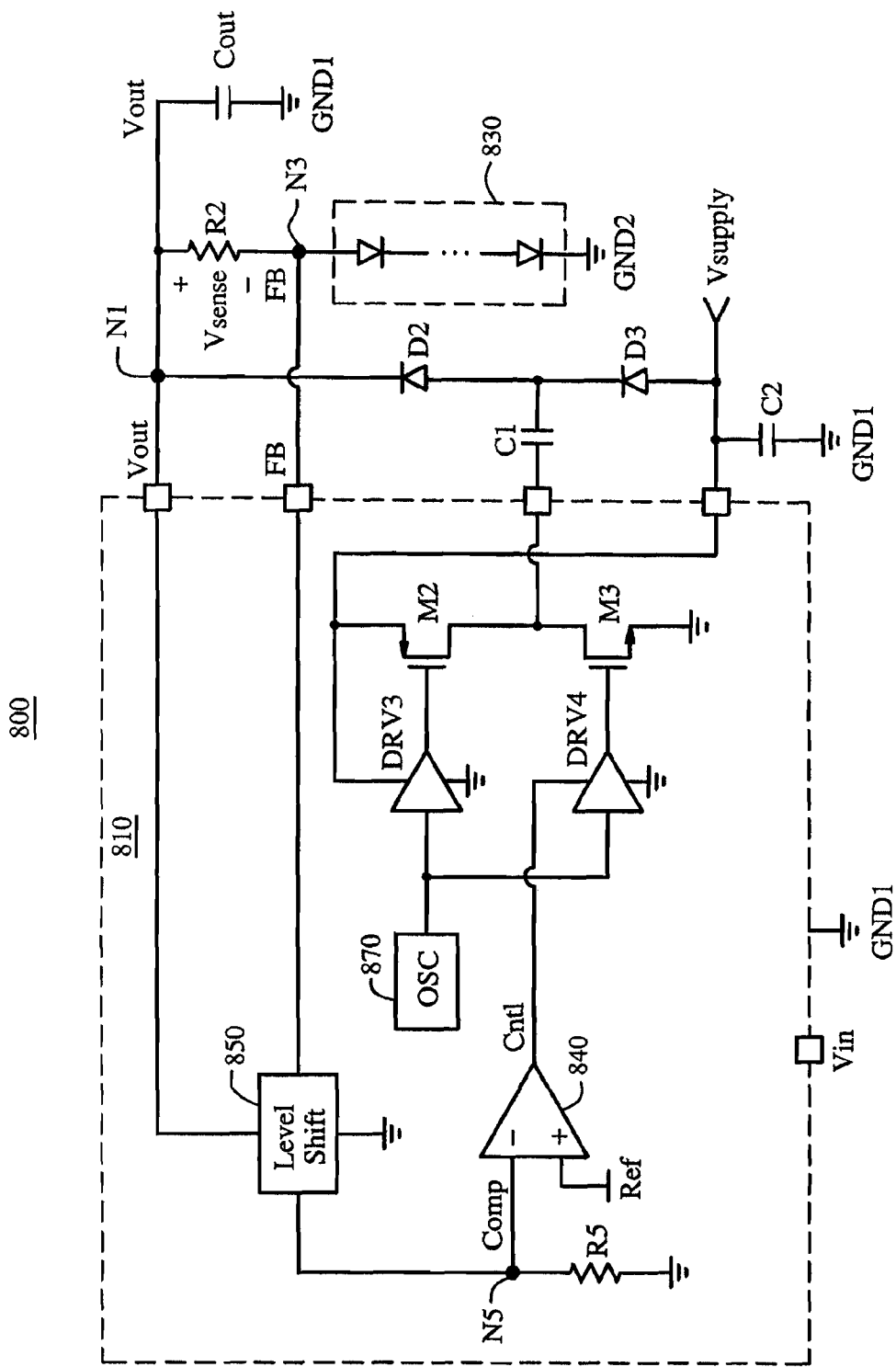
FIG. 8 shows a block diagram of an embodiment of the boost converter of FIG. 3 in which the boost converter is switched-capacitor based.

FIG. 3 illustrates an embodiment of circuit 300 in which an asynchronous-rectified inductive-based boost converter is employed. In other embodiments, circuit 300 may be a synchronously-rectified converter, as illustrated in FIG. 7 and discussed below in one embodiment. In other embodiments, circuit 300 may be a switched-capacitor based boost converter rather than inductive-based, as illustrated in FIG. 8 and discussed below in one embodiment.

Figure 4:
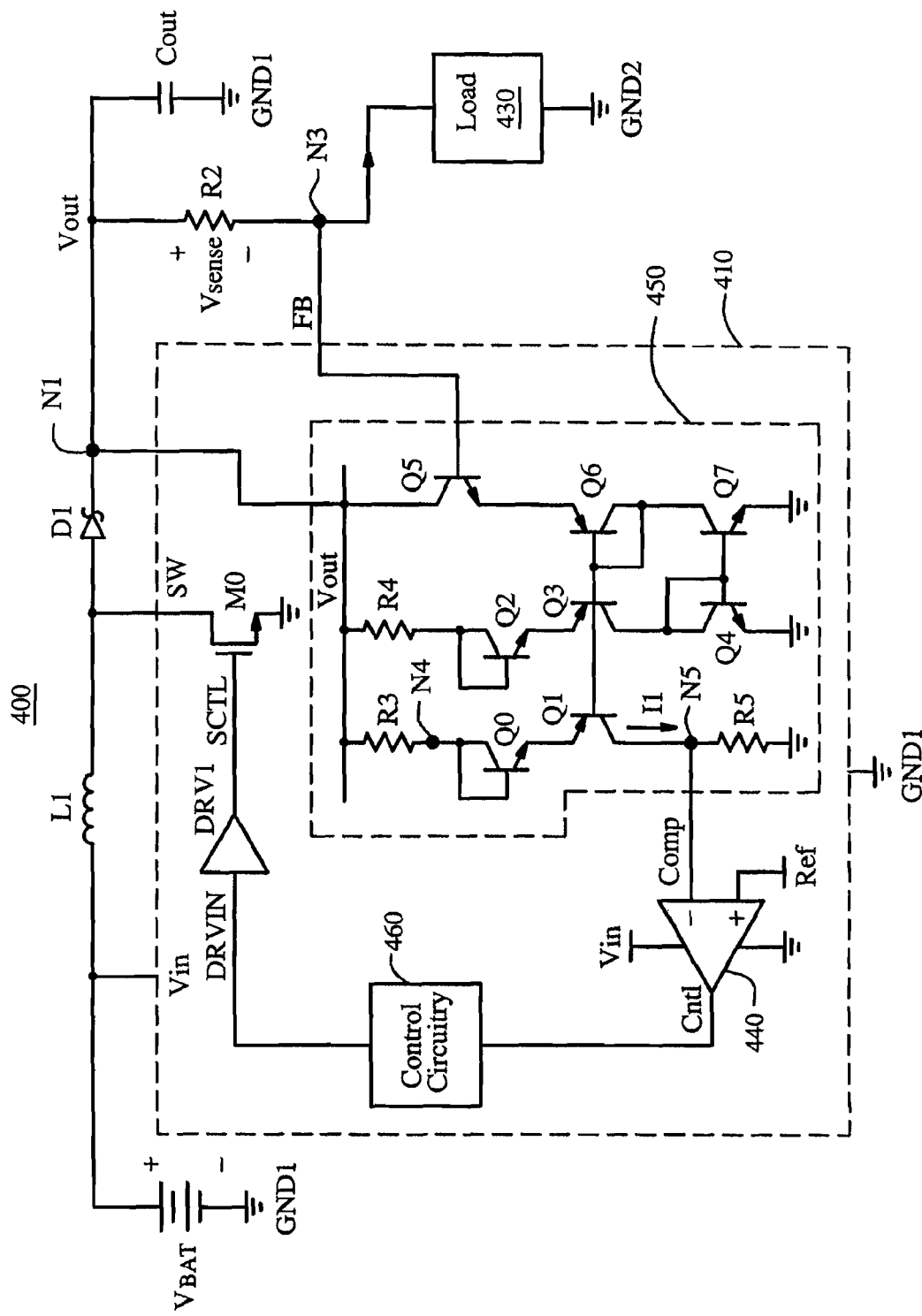
FIG. 4 shows a block diagram of an embodiment of the circuit of FIG. 3 in which an embodiment of the level-shift circuit is schematically illustrated.

FIG. 4 shows a block diagram of an embodiment of the circuit 400, which may be employed as an embodiment of circuit 300 of FIG. 3. Level-shift circuit 450 includes transistors Q0-Q7 and resistor circuits R3-R5.

Transistors Q1, Q3, and Q6 are configured to operate as a current mirror, and transistors Q4 and Q7 are configured to operate as another current mirror. The base-emitter junctions of transistors Q5, Q6, Q1, and Q0 are arranged to operate as a translinear loop so that the voltage at node N4 is substantially equal to the voltage at node N3. That is, the voltage at node N4 is given by FB−VBE$_{Q5}$−VBE$_{Q6}$+VBE$_{Q1}$+VBE$_{Q0}$, or approximately FB. Accordingly, the voltage across resistor circuit R3 is substantially equal to the voltage across resistor circuit R2. The current through resistor circuit R3 is substantially given by Vsense/R3. Further, the current through resistor circuit R5, current I1, is substantially the same as the current through resistor circuit R3, so that the voltage drop across resistor circuit R5 is substantially given by Vsense*(R5/R3). Accordingly, the voltage at node N5 is substantially given by Vsense*(R5/R3), referenced to ground $GND_1$.

Additionally, resistor circuit R4 and transistors Q2, Q3, Q4, and Q7 are optional circuit elements in level-shift circuit 450 that are arranged to operate as a feedback loop to keep current I1 at a substantially fixed value in spite of noise and other spurious effects.

Transistors Q0-Q7 are illustrated as BJTs in FIG. 4. In other embodiments, types of transistors other than BJTs may be employed. Also, each of the resistor circuits R3-R5 may include one or more resistors.

Figure 5:
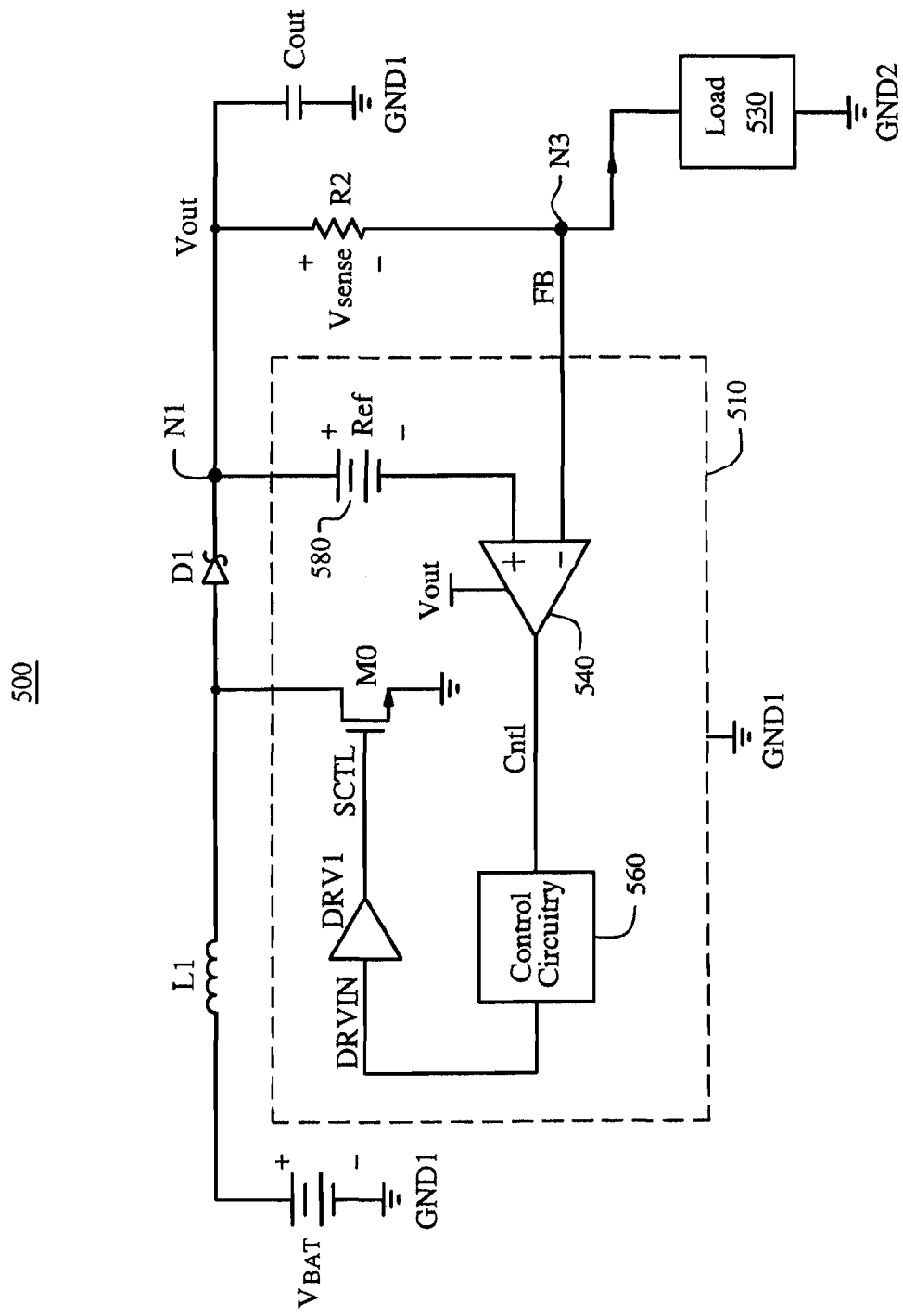
FIG. 5 illustrates a block diagram of an embodiment of the circuit of FIG. 2 in which the reference voltage is referenced to Vout.

FIG. 5 illustrates a block diagram of an embodiment of circuit 500. Circuit 500 may be employed as another embodiment of circuit 200 of FIG. 2. Components in circuit 500 may be arranged to operate in a similar manner to similarly-named components previously discussed, and may operate in a different manner in some ways.

Feedback circuit 540 operates in a similar manner as discussed above with regard to feedback circuit 340 of FIG. 3, except that, instead of receiving ground-referenced signals, feedback circuit 540 receives signals referenced to output voltage Vout. Unlike the reference circuit discussed above with regard to FIG. 3, reference circuit 580 is arranged to provide signal Ref such that signal Ref is referenced to output voltage Vout. Feedback circuit 540 is arranged to receive signal Ref at its inverting input, and receive signal FB as a comparison signal at its noninverting input. Further, feedback circuit 540 is arranged to provide signal Cnt1 based on signals Ref and FB.

Figure 6:
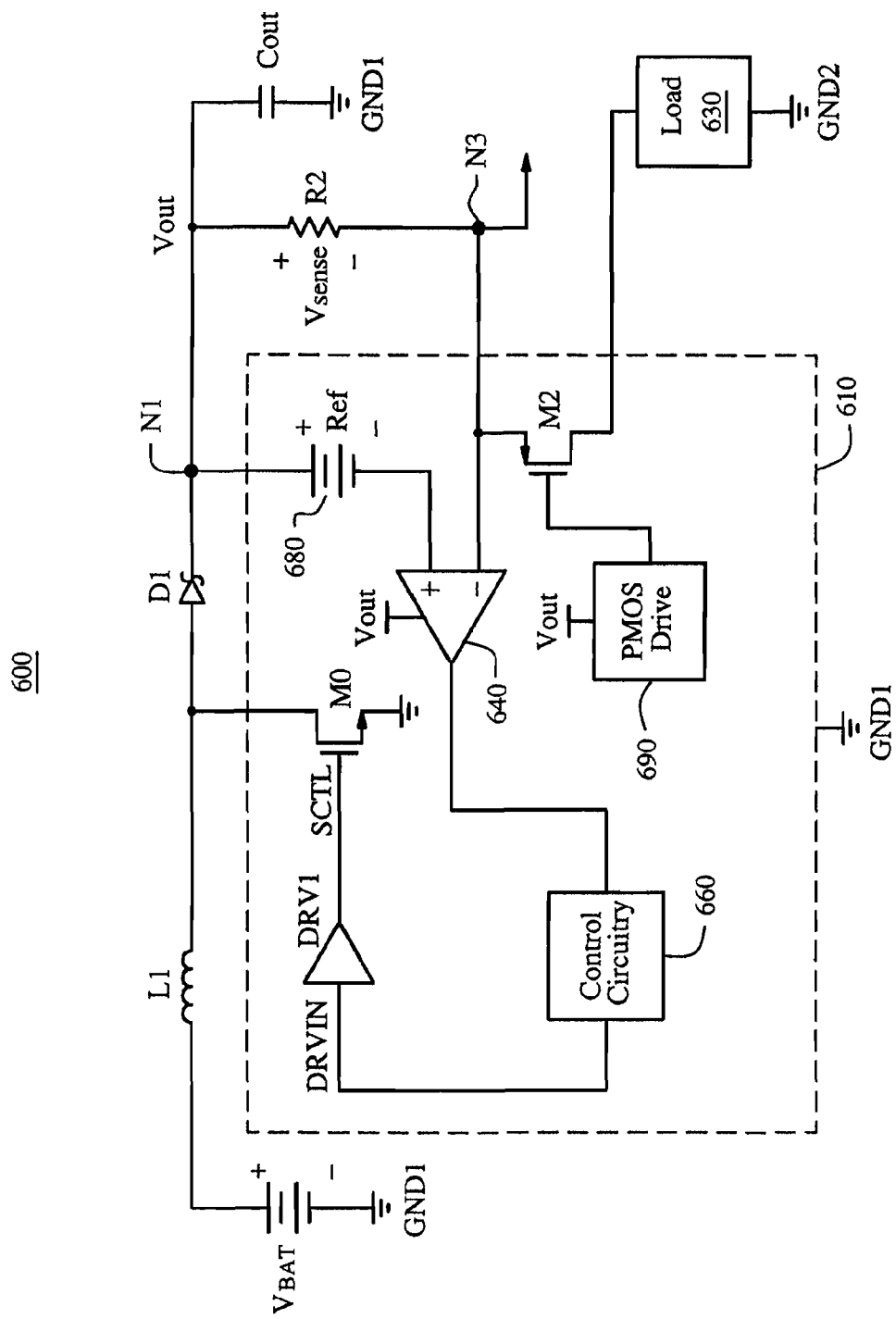
FIG. 6 shows a block diagram of an embodiment of the circuit of FIG. 5 that includes a cut-off switch.

FIG. 6 shows a block diagram of an embodiment of circuit 600. Circuit 600 is an embodiment of circuit 500 of FIG. 5. Circuit 600 further includes transistor M2 and PMOS drive circuit 690. Transistor M2 is arranged to operate as a cut-off switch responsive to PMOS drive circuit 690. The cut-off switching is employed to limit leakage currents and to enhance brightness control.

FIG. 7 illustrates a block diagram of an embodiment of circuit 700. Circuit 700 may be employed as an embodiment of circuit 200, 300, or 400 above. Boost converter 710 is a synchronously-rectified converter which includes driver circuit DRV2 and power transistor M1 instead of diode D1.

FIG. 8 illustrates a block diagram of an embodiment of circuit 800. Circuit 800 may be employed as an embodiment of circuit 200, 300, or 400 above. Components in circuit 800 may operate in a substantially similar manner to similar-named components discussed in previous figures, and may operate in a different manner in some ways.

Circuit 800 further includes capacitors C1-C2 and diodes D2 and D3. Boost converter 810 includes transistors M2 and M3, driver circuits DRV3 and DRV4, oscillator circuit 870, error amplifier 840, resistor circuit R5, and level-shift circuit 850. Boost converter 810 is a switched-capacitor based boost converter. Also, level-shift circuit 850 is arranged to operate in a substantially similar manner as described above with regard to level-shift circuit 350 of FIG. 3. Driver circuit DRV4 is arranged to modulate the on-resistance of transistor M3.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for driving a load, comprising:
   a first ground plane;
   a second ground plane that is separate from the first ground plane, wherein the load is coupled to the second ground plane, and wherein the load includes at least one of a white LED string and a display;
   a sense resistor circuit that is coupled between an output voltage node and a feedback voltage node such that the sense resistor circuit is coupled in series with the load, wherein the sense resistor is arranged to receive an output voltage at the output voltage node, and to provide the feedback voltage based on a load current through the load such that the feedback voltage is referenced to the output voltage;
   a boost converter that is arranged to regulate the output voltage based on the feedback voltage, wherein the first ground plane is local to the boost converter; and
   a level-shift circuit that is arranged to provide a comparison signal from the feedback voltage such that the comparison signal is referenced to ground.

2. The circuit of claim 1, wherein the boost converter includes:
   a feedback circuit having at least a first input and a second input, wherein the feedback circuit is arranged to receive a reference signal at the first input; to receive a feedback voltage at the second input; and to provide a control signal that is based, in part, on the reference signal and the comparison signal, wherein the feedback circuit includes at least one of an error amplifier and a comparator;
   a switch circuit; and
   a driver circuit that is arranged to drive the switch circuit based, in part, on the control signal such that the output voltage is regulated based, in part, on the control signal.

3. The circuit of claim 2, wherein the boost converter further includes:
   a voltage reference circuit that is configured to provide the reference signal such that the reference signal is referenced to the output voltage, wherein the comparison signal is the feedback voltage.

4. The circuit of claim 2, wherein
   the sense resistor is arranged such that the feedback voltage is referenced to the output voltage rather than ground such that a voltage difference between the feedback voltage and the output voltage is approximately proportional to the load current.

5. The circuit of claim 2, wherein the boost converter further includes:
   a pulse width modulation control circuit that is arranged to provide a pulse width modulation output signal such that a pulse width of the pulse width modulation output signal is modulated based on the control signal, wherein the feedback circuit is the error amplifier, and wherein the driver circuit is arranged to drive the switch circuit based on the pulse width modulation output signal.

6. The circuit of claim 2, wherein the boost converter further includes:
   a pulse frequency modulation circuit that is arranged to provide a pulse frequency modulation output signal such that a frequency of the pulse frequency modulation signal is modulated based on the control signal, wherein the feedback circuit is the comparator, and wherein the driver circuit is arranged to drive the switch circuit based on the pulse frequency modulation output signal.

7. The circuit of claim 2, wherein the feedback circuit is the error amplifier, and wherein the driver circuit is arranged to modulate an on-resistance of the switch circuit based on the control signal.

8. The circuit of claim 1, wherein the boost converter further includes:
 a voltage reference circuit that is configured to provide the reference signal such that the reference signal is referenced to the ground, wherein the level-shift circuit includes:
  a first resistor circuit, wherein the level-shift circuit is arranged such that a first-resistor voltage across the first resistor circuit is substantially equal to the feedback voltage, and further arranged to provide a first-resistor current responsive to the first-resistor voltage; and
  an impedance current coupled between ground and the second input of the feedback circuit, wherein the impedance circuit is arranged to provide the comparison signal based, in part, on the first-resistor current.

9. The circuit of claim 1, wherein the level-shift circuit includes:
 a transistor having at least an emitter, a collector that is coupled to an output node, and a base that is coupled to the feedback voltage, wherein the transistor is arranged to receive the output voltage at the output node;
 a first resistor that is coupled between the output node and another node;
 a translinear loop that is arranged such that a resistor voltage at the other node is substantially equal to a voltage at the emitter of the first transistor, wherein the translinear loop includes a base-emitter junction of the transistor; and wherein the first resistor is arranged to provide a first-resistor current based on a voltage drop across the first resistor; and
 an impedance circuit coupled between ground and the second input of the feedback circuit, wherein the impedance circuit is arranged to provide the comparison signal based, in part, on the first-resistor current.

10. The circuit of claim 9, wherein the boost converter further includes:
 a current loop control circuit that is arranged to provide negative feedback for the first-resistor current, wherein the current loop control circuit includes at least part of the translinear loop.

11. A circuit for driving a load, comprising:
 a first ground plane;
 a second ground plane that is separate from the first ground plane, wherein the load is coupled to the second ground plane, and wherein the load includes at least one of a white LED string and a display;
 a sense resistor circuit that is coupled between an output voltage node and a feedback voltage node such that the sense resistor circuit is coupled in series with the load, wherein the sense resistor is arranged to receive an output voltage at the output voltage node, and to provide the feedback voltage based on a load current through the load such that the feedback voltage is referenced to the output voltage; and
 a boost converter that is arranged to regulate the output voltage based on the feedback voltage, wherein the first ground plane is local to the boost converter, and wherein the boost converter includes:
  a feedback circuit having at least a first input and a second input, wherein the feedback circuit is arranged to receive a reference signal at the first input, wherein the reference signal is referenced to the output voltage; to receive a feedback voltage at the second input; and to provide a control signal that is based, in part, on the reference signal and the comparison signal, wherein the feedback circuit includes at least one of an error amplifier and a comparator;
  a switch circuit; and
  a driver circuit that is arranged to drive the switch circuit based, in part, on the control signal such that the output voltage is regulated based, in part, on the control signal.

* * * * *

UNITED STATES PATENT AND TRADEMARK OFFICE
CERTIFICATE OF CORRECTION

PATENT NO. : 7,679,295 B1  Page 1 of 1
APPLICATION NO. : 11/940186
DATED : March 16, 2010
INVENTOR(S) : Michael J. Collins It is certified that error appears in the above-identified patent and that said Letters Patent is hereby corrected as shown below:

On the face page, in field (56), under "Other Publications", in column 2, line 2, delete "Nostrans" and insert -- Nostrand --, therefor.

In column 3, line 41, delete "12" and insert -- R2 --, therefor.

In column 3, line 63, delete "Cnt1" and insert -- Cntl --, therefor.

In column 3, line 66, delete "Cnt1." and insert -- Cntl. --, therefor.

!n column 4, line 3, delete "Cnt1" and insert -- Cntl. --, therefor.

In column 4, line 6, delete "Cnt1" and insert -- Cntl --, therefor.

In column 5, line 35, delete "Cnt1" and insert -- Cntl --, therefor.

Signed and Sealed this

Nineteenth Day of October, 2010

David J. Kappos
*Director of the United States Patent and Trademark Office*